United States Patent [19]

Deslauriers et al.

[11] 4,053,406
[45] Oct. 11, 1977

[54] APPARATUS AND METHOD FOR RECOVERING OIL FROM ICY WATERS

[75] Inventors: Paul C. Deslauriers; Richard P. Voelker; Everett J. Lecourt; Lawrence A. Schultz, all of Columbia, Md.

[73] Assignee: Artec, Incorporated, Columbia, Md.

[21] Appl. No.: 611,689

[22] Filed: Sept. 9, 1975

[51] Int. Cl.² .............................................. E02B 15/04
[52] U.S. Cl. .............................. 210/71; 210/DIG. 25; 210/242 S
[58] Field of Search ........... 210/44, 83, 242, DIG. 25, 210/26, 71; 62/320, 123, 58; 299/27, 28; 159/DIG. 5

[56] References Cited

U.S. PATENT DOCUMENTS

| | | | |
|---|---|---|---|
| 212,715 | 2/1879 | Mahan | 299/28 |
| 2,780,281 | 2/1957 | Reinert | 159/DIG. 25 |
| 2,883,957 | 4/1959 | Ehinger | 299/28 X |
| 3,049,889 | 8/1962 | Carfagno | 62/58 W |
| 3,098,735 | 1/1963 | Clark | 159/DIG. 5 |
| 3,171,727 | 3/1965 | Brown et al. | 62/58 |
| 3,659,713 | 5/1972 | Mueller | 210/DIG. 21 |
| 3,726,406 | 4/1973 | Damberger | 210/DIG. 25 |
| 3,859,069 | 1/1975 | Seliber | 62/58 |
| 3,890,234 | 6/1975 | Galicia | 210/242 S |
| 3,922,225 | 11/1975 | Strain | 210/242 S |

*Primary Examiner*—Theodore A. Granger
*Attorney, Agent, or Firm*—Cushman, Darby & Cushman

[57] ABSTRACT

An acquatic vessel, preferably a barge which is either self- or non-self-propelled is equipped with ice cutting, oil recovery and processing apparatus. The ice covered area that is polluted with oil is approached by the vessel and the oil-contaminated ice is cut into slabs which are conveyed to a cleaning station where high pressure air and/or water jets and/or chippers remove the oil and some of the exterior of the slab. The oil and ice mixture that is removed from the slab is collected and heated. The oil is separated and purified and used as fuel and/or stored. The cleaned ice slabs are dropped back in the channel behind the vessel. Oil that is located beneath the ice, not adhering to the ice slabs, travels down an inclined plane under the vessel, rises in a well, and is separated out and used as fuel or stored.

The vessel can also be used to clear an area, such as a harbor, of ice and to transport the collected ice to a designated area, since it has the capabilities for loading, storing, and off-loading ice. The propulsion means for the barge may include Archimedes' screws for propelling the barge at slow speeds.

46 Claims, 8 Drawing Figures

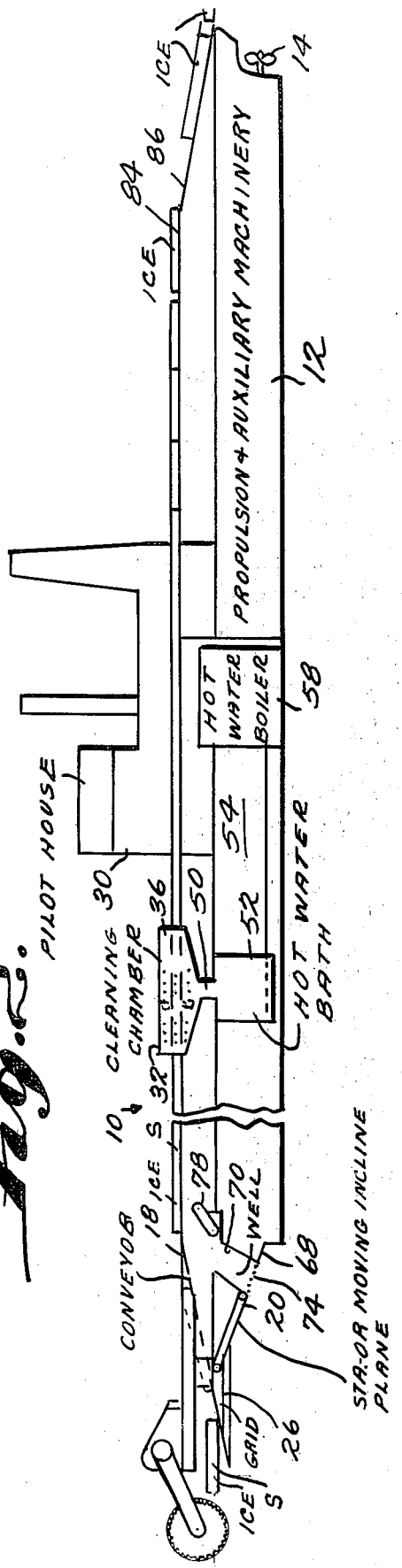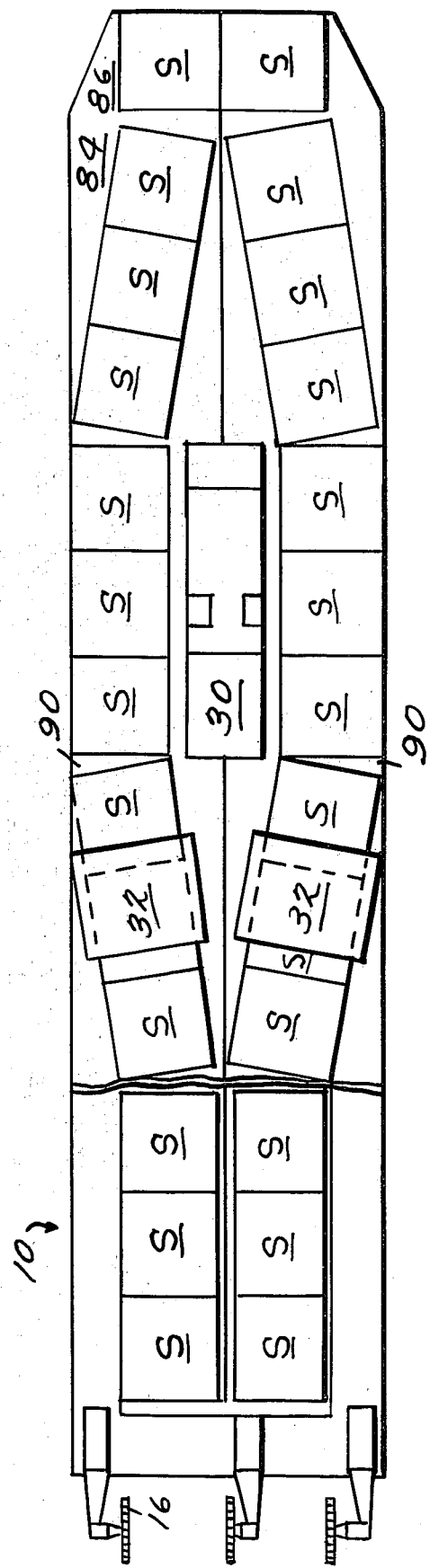

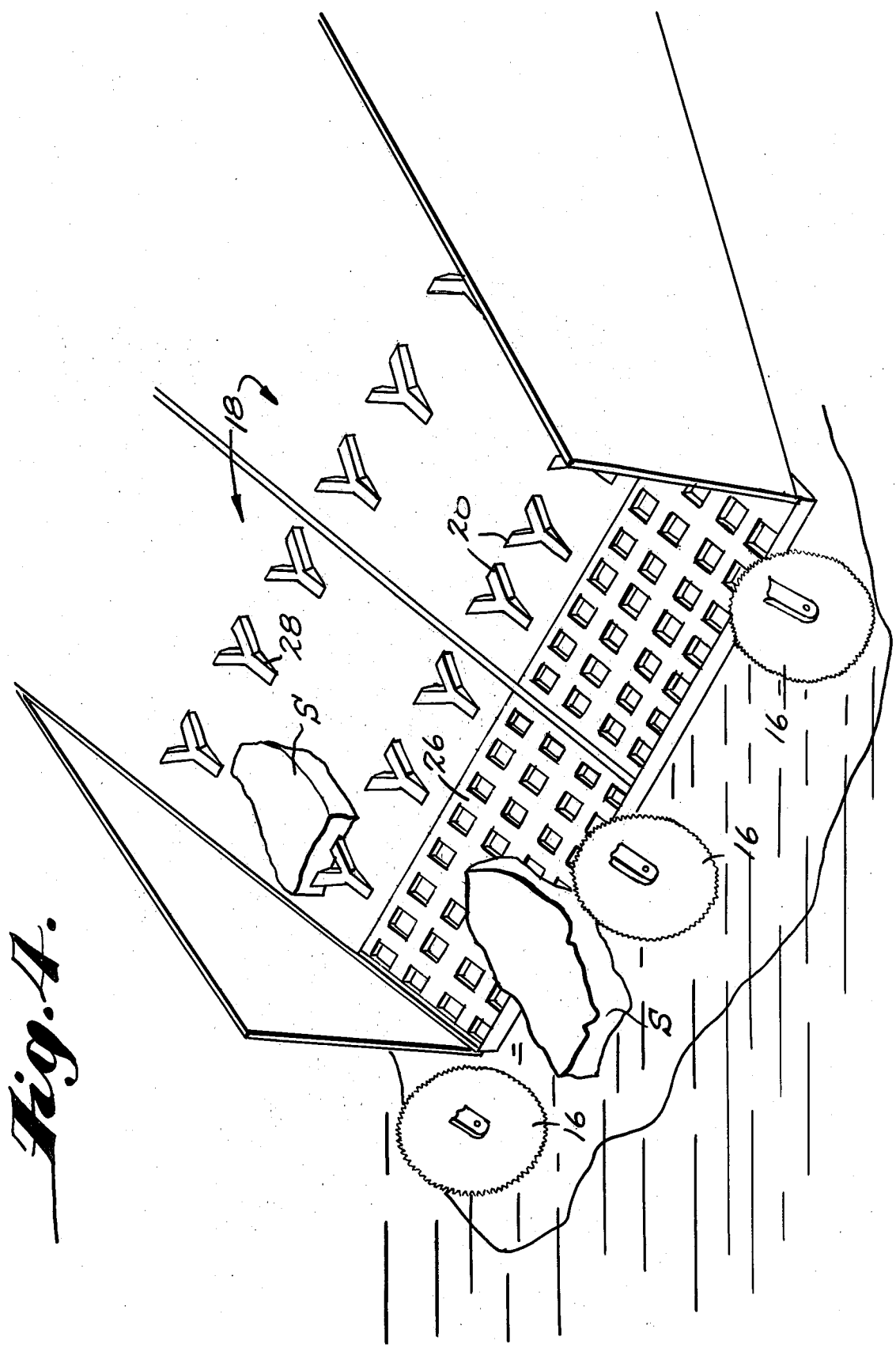

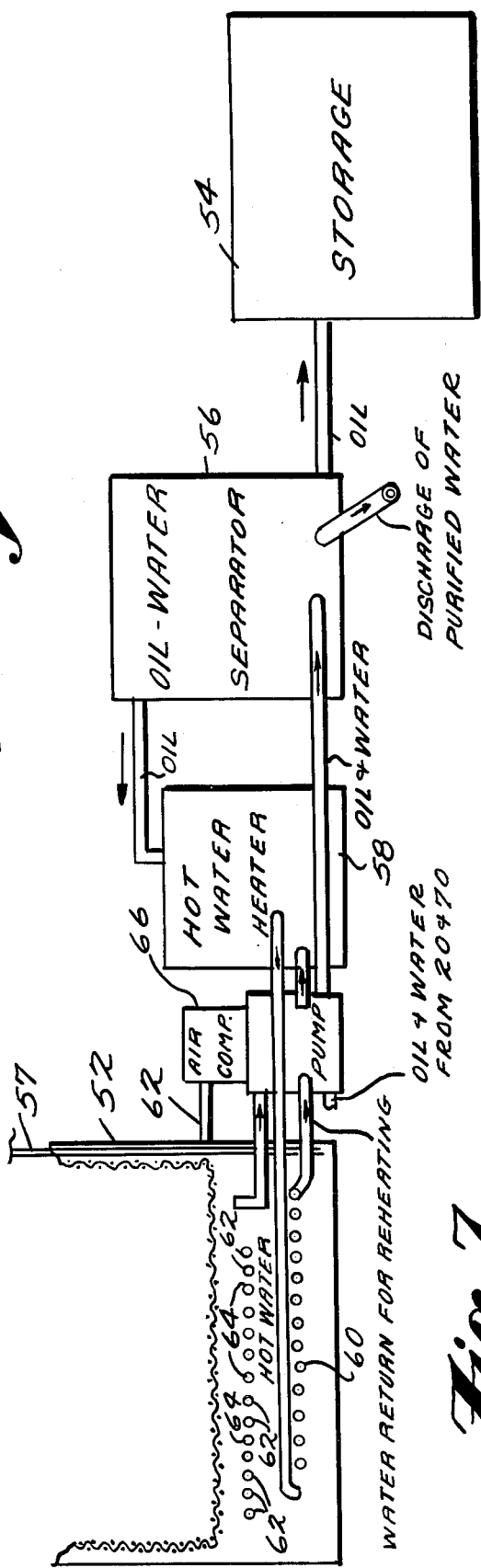

APPARATUS AND METHOD FOR RECOVERING OIL FROM ICY WATERS

BACKGROUND OF THE INVENTION

On Feb. 4, 1970, the tanker Arrow struck Cerberus Rock in the entrance to Chedabucto Bay, Nova Scotia in bad weather. Most of the cargo of 16,000 tons of Bunker C oil was lost into the icy waters. The spill was extensively studied and reported upon because more spills in icy waters are expected to occur as more oil is produced from wells in the Artic region.

One report of the spill, delivered at the Fourth Annual Offshore Technology Conference held at Houston, TX on May 1-3, 1972, is Paper Number OTC 1522, *The Behavior of Oil Spilled in a Cold Water Environment,* by A. Y. McLean of Nova Scotia Technical College. The report concludes that, while spilling oil in ice waters is initially blessed by the capacity of the ice and coldness to confine the spill to a smaller geographical area, the problem of recovery of oil from oil-water-ice slurry is insoluble, the removal of oil trapped in ice is extremely difficult, and the problem of recovering oil from a mixture of oil and ice is virtually insurmountable. The report further concludes one must wait until the seasons progress and the weather warms and the ice melts before oil recovery is feasible. Of course, the thawing permits the spilled oil to spread, and the earlier effect of containment of the spill by ice is lost.

Exploration for energy resources in the Arctic and in other ice covered waters is occuring at an everincreasing rate to alleviate the current shortages of oil and gas. With this increase in activity, there is need for a device which can effectively clean up oil which accidentally (or by nature) comes in contact with ice. Such occurrences could result in a single spill with tons of oil under the ice or mixed with broken ice floes. Such spills could also result from ships moving in the Arctic waters. At best, today, one would have to wait for the ice to melt before beginning clean-up procedures. Such a wait could result in such wide dispersion of the oil that contamination would extend for hundreds of square miles. Under these circumstances, clean-up would be unfeasible; hence, a need exists to recover the oil while ice is present.

The present inventors initially considered the feasibility of scooping up as much of the contaminated ice and spilled oil as possible and using the recovered oil for fuel to melt all of the contaminated ice so the oil could be separated therefrom. However, calculations have shown that for most spills the heat needed to melt all the contaminated ice will exceed that available from burning the recovered oil. The realization led to development of the present invention.

In designing the process and apparatus of the present invention, the inventors drew upon their combined knowledge and upon the following publications.

I. McLean, A. Y., "The Behavior of Oil Spilled in a Cold Water Environment", *Offshore Technology Conference,* OTC 1522 (May, 1972).

II. Waggner, J. P. and Cappel, K., "Concept Development Program for Icebreaking on the Upper Mississippi River", The Franklin Institute Research Laboratories, Pennsylvania, Technical Report F-C 2717, to the Unites States Coast Guard, Contract No. DOT-CG-00397-A (March, 1971).

III. Bianchi, R. A., Farrel, J. H., and Johanson, E. E., "Demonstration of Fixed and Moving Inclined Plane Oil Skimmers for Collecting Oil Under the Water Surface", *Offshore Technology Conference,* OTC 1520 (May, 1972).

IV. Bianchi, R. A., Farrell, J. H., and Johanson, E. E., "The Application of Skimmers, Piston Films, and Sorbents for Open Water Spills", *Offshore Technology Conference,* OTC 1746 (April, 1973).

V. Gollan, A. and Fruman, D. H., "A Filter Coalescer Device for Oil-Water Separation", *Offshore Technology Conference,* OTC 2127 (May, 1974).

VI. Glaser, J. L., Vance, G. P., "A Study of the Behavior of Oil Spills in the Arctic". Prepared for U.S. Coast Guard Headquarters, Washinton, D. C., Project Number 714108/A/001,002. (Feb. 1971)

VII. Hoult, David P, "The Aging of Oil Spilled in the Arctic", Massachusetts Institute of Technology. (August 1971)

VIII. Keevil, Benjamin E, and Ramseier, Rene O., "Oil Pollution in Ice Covered Rivers", Internal Report 22 to Glaciology Division, Water Resources Branch, Department of the Environment, Canada. (May 1974)

IX. McMinn, T. J., "Crude Oil Behavior on Arctic Winter Ice". Environmental and Transportation Technology Division, Office of Research and Development for U.S. Coast Guard Project 734108. (Sept. 1972)

X. Ramseier, Rene O., "Possible Fate of Oil in the Arctic Basin". First World Congress on Water Resources. (Sept. 1973)

XI. Wolfe, L. S., Hoult, D. P., "Effects of Oil Under Sea Ice", Massachusetts Institute of Technology, for the United States Coast Guard, U.S. Dept. of Transporttion, under Contract Number DOT-CG-12438-A. (August 1972)

In addition, the inventors are aware of some development work done by Chrysler Corporation and others in the early 1960's on the use of Archimedian screw propulsion systems for amphibian vehicles and the like.

SUMMARY OF THE INVENTION

This invention relates to an oil recovery device capable of effective use in ice covered waters, cold regions, and temperate waters. The primary object of this invention is to provide for recovery of oil underneath ice at a very high oil recovery rate and at the same time remove the oil which adhered to the surfaces of the ice. Still another object of the present invention is to provide a device that will be able to clean up oil where ice floes are present.

Furthermore, this invention is capable of efficiently collecting and separating oil that is on top of ice or covered by snow. Another object of the present invention is to provide a device capable of clean-up of oil that is sandwiched between ice layers. This may occur when oil comes in contact with the underside of an existing ice cover with the subsequent freezing of the water below the oil layer. Additionally, ice floes can engulf oil between them; and, when refreezing of these floes occurs, the oil is trapped. Oil-contaminated ice absorbs greater than normal quantities of solar radiation causing melting effects. The melting of the ice allows the oil to seep downward and subsequent refreezing on top brings about sandwiching of oil between layers. Finally, it should be noted that the apparatus and method of the invention provide a capability for recovering oil in ice-free waters in the cold regions were oil viscosity is high.

The apparatus of the preferred embodiment of the invention includes three saws at the forward end of a self-propelled barge which slot the ice into two cantilevers. The forward movement of the barge pushes the slotted ice up an inclined ramp onto the barge at which point the ice breaks into two rows of large slabs and is then transferred to a conveyor system. The ice is moved along by conveyor to an enclosed cleaning chamber where high pressure air and/or water jets are used to remove any oil adhering to the ice. Concurrently, an ice cutter can be engaged to chip the ice slab to get at oil which has been sandwiched within the ice slab. The ice-oil-water mixture is collected below the cleaning chamber in a hot water bath where the oil is initially separated from the water. Subsequently, the oil is heated, purified, and stored, or used for fuel for the hot water boiler which supplied heat to the hot water bath. Each clean piece of ice is then moved aft out of the cleaning chamber and an oil-contaminated ice slab enters. The clean ice slabs are moved further aft on the barge by the conveyor system until they reach an inclined ramp which deposits the ice pieces back in the clean channel. In this manner the ice slabs do not have to be entirely melted and the replacing of old ice slabs back in the channel precludes the formation of a large quantity of new ice.

During the raising of an ice slab onto the barge, the oil which was below the ice is forced underneath the barge. As it travels underneath the barge, a moving inclined plane forces the oil further underwater until it reaches the collection well in the barge. Because of the relative buoyancy of the oil, as soon as it clears the inclined plane, the oil will tend to rise at a rapid rate where it goes through baffles and into the oil collection well. Because of the oil's high viscosity, an oleophillic belt, such as the "Filterbelt" of Marco Pollution Control, Seattle, Wash., or a similar device is employed and is used to transport the oil from the oil collecting well to an area where the oil is heated. The oil is then added to the purifier where the oil and water are separated. The oil is stored or is additionally heated in a fuel oil heater to raise its temperature sufficiently so that it will burn efficiently and cleanly. The combustion gases can then be used in the heating boiler which provides heat to the hot water bath.

Still another object of the invention is to provide an ice channel cutter that may be utilized to cut ice of various thicknesses whereby said ice may be stored on board for discharge at a later period, such as when clearing docks, wherein the ice must be stored on board and then discharged after the barge has moved to a designated ice disposal area. In a similar manner, it can be employed as a broken ice channel clearing device for those situations where broken ice has built up to large thicknesses in a ship channel. For these conditions, the broken ice pieces slide up to the conveyor and are stored on board for discharge at a later time at a designated ice disposal area.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE INVENTION IN THE DRAWINGS

FIG. 1 is a top plan view of the barge;

FIG. 2 is a longitudinal sectional view of the barge in operation;

FIG. 4 is a fragmentary perspective view of the bow, on a larger scale;

FIG. 6 is a schematic side elevation view of the oil-/water separation system;

FIG. 7 is a schematic top plan view of a typical path of the barge through an oil spill; and FIG. 8 is a cross-sectional view of a typical slab of oil-contaminated ice.

DETAILED DESCRIPTION

Figure 3:
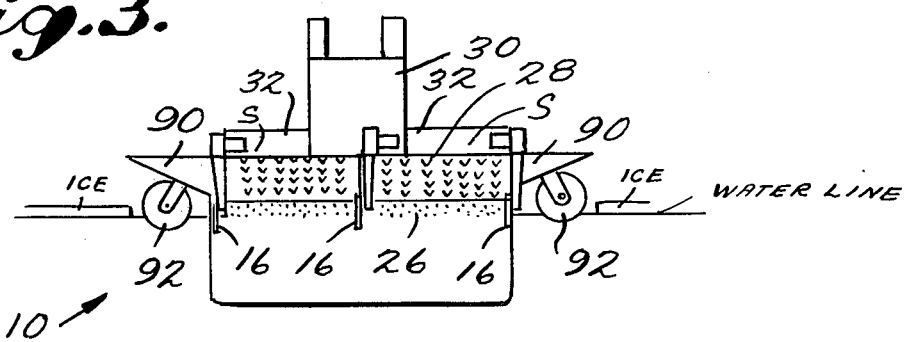
FIG. 3 is a front elevation view of the barge.
Figure 5:
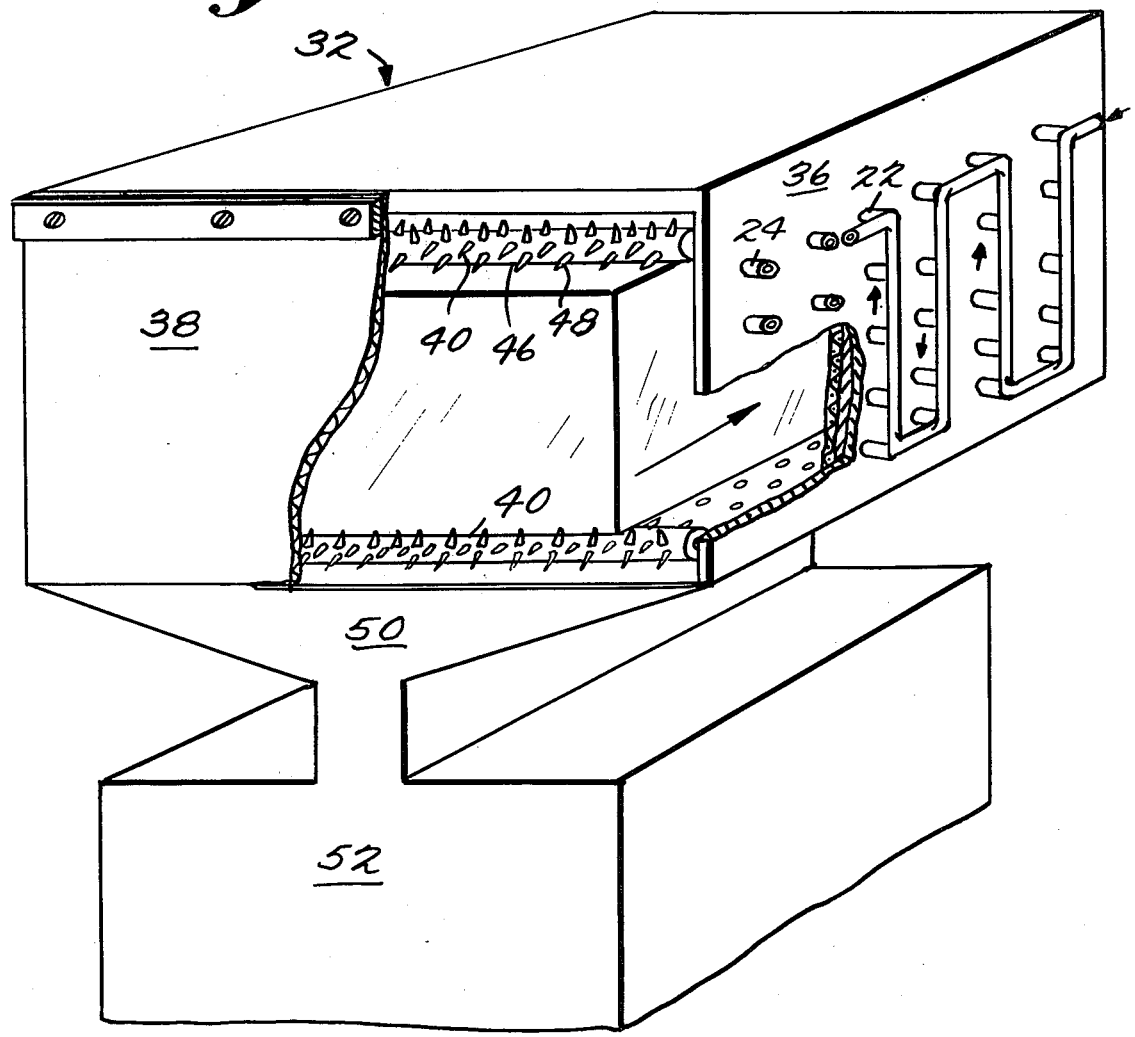
FIG. 5 is a fragmentary perspective view of one cleaning chamber.

The self-propelled barge 10 contains at 12 the necessary power equipment to operate the propeller(s) 14 and the auxiliary power machinery to operate the saws 16, the conveyor 18, underwater movable belt or stationary inclined plane 20, pumps and compressors to operate the water and/or air jets 22, 24 and other machinery. Three saws 16 are mounted on the bow of the barge 10 to slot the ice. The saws 16 are retractable upwardly when operations are in ice-free waters. Immediately aft the three saws 16 is an upward sloping grid 26 which provides for separation of the oil and water which passes under the barge and the contaminated ice which is loaded onto the barge. A conveyor system 18 with gripping claw-like spikes 28 moves the ice slabs S across the deck of the barge 10. Just forward of the pilot house 30 from which the barge is controlled, a cleaning station 32 is employed to clean the ice slabs S.

The cleaning station 32 includes a housing 34 defined by steel side walls 36 and flexible curtains 38 fore and aft. The walls 36 mount a plurality of rows of air and/or water jets 24, 22 surrounding the path of the ice slabs through the cleaning station 32 and which cause the oil to be displaced from the exposed surface of each ice slab as it passes through the housing 34. In cases where the oil has been sandwiched within the ice, a retractable ice chipper 40 is activated, manually or automatically, e.g. by photoelectric means, to chip away sufficient ice to expose the oil for removal by the jets 22. As shown, two chippers 40 are provided, one engageable with the upper surface and the other with the lower surface of the ice slabs. Either or both may be used on any particular slab, depending on the location of the oil-contaminated region therein. Each chipper as shown includes a rotatable bar 46 with a plurality of projecting spikes 48.

The oil-ice-water mixture falls by gravity to a collection area 50 and then enters a hot water bath 52. The hot water bath 52 melts the ice chips and lowers the viscosity of the oil at which time the oil is collected and either stored in holding tanks 54, or transferred to a conventional purifier 56. Note that the water jets 22 in the cleaning chamber 32 use hot water from the hot water bath 52. This hot water is taken via piping 57 from the lower portion of the hot water bath 52 which portion is free of oil.

From the purifier 56, the clean oil is transferred to the fuel oil heater and burned in the hot water boiler 58 which provides heat to the hot water bath 52 by means of a heat exchanger consisting of pipes 60 passing through the lower section of the hot water bath 52. Several air pipes 62 with orifices 64 are also located at the bottom of the hot water bath 52. Air from the air compressor 66 which also supplies air for air jets 24 in the cleaning chamber 32 is discharged through the orifices 64. The rapidly rising air bubbles provide for turbulent mixing of the water in the hot water bath 52 to assure a continuous supply of hot water in the upper section of the hot water bath.

At the bow of the barge 10, oil which is left in the water as the ice slabs are loaded on the barge is forced under the hull 68 to a collection well 70 by means of an inclined plane 20. Preferably the inclined plane is surfaced with a moving endless belt to positively advance the oil therealong, as the oil is often so viscous it would stick to a stationary surface and remain there. At the collection well 70, baffles 74 exist to preclude solid objects from rising to the inside surface while permitting the passage of oil. At the collection well upper surface 76 oil is removed by an oleophillic belt or other functionally similar device and transferred either to a storage tank 54 or to a pre-heater 58 for the purifier 56. The purifier 56 is, typically a Cata-Sep marine oil/water separator manufactured by Cata-Sep corporation, 3820 Charles Page Blvd., Tulsa, Ok. 74101. After purification to remove brine and the like, the oil is transferred to the fuel oil heater and burned in the hot water boiler 58 as previously described.

As the ice slabs S continuously move one after another through the cleaning chamber 32, they are conveyed aft on the barge to a location 84 where the cleaned ice slabs slide down an inclined plane 86 and into the cleared channel.

While the specific details of the barge 10 per se have been omitted, it will be understood that they conform to the accepted specification in the marine industry.

Further, the particular size of the saws 16 located forward of the barge and the spacing thereof may be varied for different types of work and any suitable means may be provided for adjusting the vertical position of the saws as well as the position of the ramps 26, 86 as the particular situation may demand. From the foregoing, the construction and the operation of the barge per se will be readily understood and further explanation thereof is believed to be unnecessary.

The following examples illustrate a typical manufacture and use of the apparatus of the invention.

An under-ice spill is determined to exist and covers an area 88 (FIG. 7) of 1000 ft. × 500 ft. The barge 10 is called upon to clean up the spill and departs port with an icebreaker escort. The icebreaker proceeds in front of the barge 10 breaking the solid ice cover into small pieces to permit the barge 10 to travel at a greater speed than if it were operating without an icebreaker escort.

The barge 10 being self-propelled with, e.g. 500 SHP can proceed through the broken ice field at about 5 miles per hour. Upon arriving in the vicinity of the oil spill, the barge 10 is refueled from the icebreaker where the crew of the barge 10 also resides. The craft 10 immediately commences operation and recovers the under ice oil spill using the technique schematically depicted in FIG. 7. The initial objective is to recover 70-80% of the oil spill in as rapid a manner as possible. A second pass can be made subsequently which would provide a more thorough clean-up.

The size of the hot water bath depends on how rapidly the barge 10 is to clean-up the spill, whether the barge 10 hot water heater is to be supplied with additional fuel so that recovered and purified, as is recommended, and whether the barge is to be primarily used in instances were the contaminating oil is on or under the ice or where the contaminating oil is also layered within the ice. Clearly, the more ice which needs to be melted in order to sufficiently clean the ice slabs and the more chipped ice and congealed oil which needs to be melted and heated in the hot water bath to maintain the bath at an average temperature of e.g., 132° F., the greater need be the capacity of the heater and hot water heating system.

In a typical construction, the cleaning chamber is provided with 300 nozzles for spraying hot water on the ice slab sides, top, and bottom, each at 100 p.s.i. and 32 gallons per minute, requiring about 600 horsepower for pumping a total of about 76,800 cubic feet of hot water per hour. In this typical construction, the hot water bath measures 40 feet long, by 20 feet wide, and 15 feet deep (12,000 cubic feet). The hot water pumped within the heat exchanger piping of the bath is continuously recirculated and is maintained separate from the water-oil-ice mixture being heated in the hot water bath.

A typical size for the barge 10 is 20 feet draft, 450 feet length, 60 feet beam at waterline and 90 feet beam, including the wings 90. Archimedian screws 92 mounted under the wings 90 may be driven by the barge's propulsion system in accordance with state of the art technology for slow speed propulsion of the barge 10, e.g., during traversals of an area of oil-contaminated ice.

The conveyor system and cleaning station shown on the port half of the barge 10 is replicated on the starboard half.

When the ice slabs which have been picked up by the barge 10 are to be off-loaded onto the ice beside the channel, they may be off-loaded laterally from the wings 90 beside, e.g., the pilot house. If the ice slabs are to be transported elsewhere, they are collected and accumulated on the conveyors until the barge has reached the assigned off-loading area. Then, the conveyors are operated to off-load the ice from the stern ramps and/or from the wings.

Although the barge 10 may be self-propelled, it could be used in association with an external propulsor such as a tub or icebreaker.

It should now be apparent that the apparatus and method for recovering oil spills from icy waters as described hereinabove possesses each of the attributes set forth in the specification under the heading Summary of the Invention hereinbefore. Because the apparatus and method for recovering oil spills from icy waters can be modified to some extent without departing from the principles of the invention as they have been outlined and explained in this specification, the present invention should be understood as encompassing all such modifications as are within the spirit and scope of the following claims.

What is claimed is:

1. A method for cleaning-up an oil spill from a body of water containing oil-contaminated ice and floating oil, comprising:
   a. providing a floating platform with a fore section and an aft section at opposite ends of a midship section, including a conveyor for loading oil-contaminated ice slabs onto the fore section, conveying these slabs along the midships section and then off of the floating platform at the aft section, wherein the floating platform includes:
      i. a plurality of cutting devices in the fore section, which are mounted to cuttingly engage the oil-contaminated ice which is about to be loaded onto the conveyor, for reducing into slabs the oil-contaminated ice in the path of said floating platform, ii. a first collector, in the fore section, for collecting floating oil from the body of water in the path of said floating platform as the ice slabs are loaded onto the floating platform therefrom;

iii. an oil removing station, in the midship section, with a cleaning device disposed adjacent the conveyor, for cleaning the ice slabs being conveyed therepast; and iv. a second collector, in the midship section, for collecting oil draining from and being cleaned from the ice slabs being conveyed along the midship section;

b. moving said floating platform along said path while operating the cutting devices, conveyor and oil removing station, to reduce oil-contaminated ice in the path of the vessel into slabs, convey those slabs onto the fore section of the floating platform, clean the slabs in the oil removing station, collect oil draining from and cleaned from the ice into the collector, and conveying the thus-cleaned ice off the aft section of the floating platform.

2. The method of claim 1, wherein a self-propelled ice cutter is used as the floating platform.

3. The method of claim 1, wherein the oil-contaminated ice is sawed into at least one strip extending in line with said path the strip being forced up an inclined deck portion at the bow of the floating platform as the floating platform advances along said path, whereby the strip breaks into a row of slabs.

4. The method of claim 3, wherein oil is removed from the slabs by impinging blasts of compressed air against the slabs at said oil removing station, and collecting that which is removed by said blasts.

5. The method of claim 4, wherein the collected, removed material is heated and purified to recover oil therefrom, and further comprising burning at least some of the recovered oil on-board the floating platform to provide energy for heating the collected, removed material.

6. The method of claim 3, wherein oil is removed from the slabs by impinging jets of heated water against the slabs at said oil removing station, and collecting that which is removed by said jets.

7. The method of claim 6, wherein the collected, removed material is heated and purified to recover oil therefrom, and further comprising burning at least some of the recovered oil on-board the floating platform to provide energy for heating the collected, removed material.

8. The method of claim 7 further comprising burning at least some of the recovered oil on-board the floating platform to provide energy for heating the water to be jetted against the slabs.

9. The method of claim 3, wherein oil is removed from the slabs by chipping oil-contaminated ice therefrom, and collecting the material which is removed by said chipping.

10. The method of claim 9, wherein the collected, removed material is heated and purified to recover oil therefrom, and further comprising burning at least some of the recovered oil on-board the floating platform to provide energy for heating the collected, removed material.

11. The method of claim 9, wherein once a layer of contaminating oil has been exposed by said chipping, this oil is removed from the slabs by impinging blasts of compressed air against the slabs at said oil removing station, and collecting that which is removed by said blasts.

12. The method of claim 9, wherein, once a layer of contaminating oil has been exposed by said chipping, this oil is removed from the slabs by impinging jets of heated water against the slabs at said oil removing station, and collecting that which is removed by said jets.

13. The method of claim 9, wherein the collected, removed material is subjected to an indirect heat exchange to melt the oil-contaminated chipped ice, congealed oil and water, and the heated oil is separated from the remainder of the collected, removed, heated material.

14. The method of claim 13, wherein the separated, heated oil is burned on-board the floating platform to provide energy for conducting the heat exchange step.

15. The method of claim 1, wherein the cleaned ice slabs are off-loaded into the channel astern the floating platform.

16. The method of claim 1, further including:
separating and purifying the oil from the first collector.

17. The method of claim 16, wherein at least some of the collected, separated and purified oil is burned on-board the platform to provide energy for use aboard the floating platform.

18. Apparatus for cleaning-up an oil spill from a body of water containing oil-contaminated ice and floating oil, comprising:

a floating platform adapted to be moved in a path through the spill, the floating platform having a fore section and an aft section at opposite ends of a midship section, including a conveyor for loading oil-contaminated ice slabs onto the fore section, conveying these slabs along the midships section and then off of the floating platform at the aft section, wherein the floating platform includes:

i. a plurality of cutting devices in the fore section, which are mounted to cuttingly engage the oil-contaminated ice which is about to be loaded onto the conveyor, for reducing into slabs the oil-contaminated ice in the path of said floating platform, ii. a first collector, in the fore section, for collecting floating oil from the body of water in the path of said floating platform as the ice slabs are loaded onto the floating platform therefrom;

iii. an oil removing station, in the midship section, with a cleaning device disposed adjacent the conveyor, for cleaning the ice slabs being conveyed therepast; and iv. a second collector, in the midship section, for collecting oil draining from and being cleaned from the ice slabs being conveyed along the midship section;

whereby the oil spill may be cleaned-up by moving said floating platform along said path while operating the cutting devices, conveyor and oil removing station, to reduce oil-contaminated ice in the path of the vessel into slabs, convey those slabs onto the fore section of the floating platform, clean the slabs in the oil removing station, collect oil draining from and cleaned from the ice into the collector, and conveying the thuscleaned ice off the aft section of the floating platform.

19. The apparatus of claim 18, wherein the floating platform is an ice cutting barge.

20. The apparatus of claim 18, wherein the cutting devices for reducing the oil-contaminated ice into slabs, comprise:
means for sawing the oil-contaminated ice into at least one strip extending in line with said path;
the platform having a bow and a stem;
an inclined deck portion dipping beneath the ice at the bow of the platform, so that, as the platform advances along said path, the strip is forced upon the inclined deck portion and is broken into a succession of slabs.

21. The apparatus of claim 20, wherein the oil removing station includes means for impinging blasts of compressed air against the slabs being conveyed therethrough; and means for collecting the materials removed by said blasts.

22. The apparatus of claim 21, further including means for heating the collected, removed material to facilitate separation of oil from the remainder; and means for separating the oil from the remainder.

23. The apparatus of claim 22, further including burning and heat exchanging means for burning the separated oil to provide energy for heating the collected removed material.

24. The apparatus of claim 20, wherein the oil removing station includes means for impinging jets of heated water against the slabs being conveyed therethrough; and means for collecting the material removed by said jets.

25. The apparatus of claim 24, further including means for heating the collected, removed material to facilitate separation of oil from the remainder; and means for separating the oil from the remainder.

26. The apparatus of claim 25, further including burning and heat exchanging means for burning the separated oil to provide energy for heating the collected, removed material.

27. The apparatus of claim 25, further including conduit means supplying the jets with heated water consisting of said remainder of collected material, following heating thereof and separation of oil therefrom.

28. The apparatus of claim 20, wherein the oil removing station includes means for chipping oil-contaminated ice from the slabs, and means for collecting the material which is removed by said chipping means.

29. The apparatus of claim 28, further including means for heating the collected, removed material to facilitate separation of oil from the remainder; and means for separating the oil from the remainder.

30. The apparatus of claim 29, further including burning and heat exchanging means for burning the separated oil to provide energy for heating the collected removed material.

31. The apparatus of claim 20, further including means for enclosing the oil removing station for containing water jet spray and to reduce heat loss.

32. The apparatus of claim 20, wherein the inclined deck portion is provided with an array of openings therethrough to permit oil located beneath the bottom of the ice strip to pass through the openings and under the hull of the floating platform.

33. The apparatus of claim 32, further including a downwardly inclined plane on the hull under the inclined deck portion at the bow of the moving platform, said downwardly inclined plane leading to a well rising within the floating platform, whereby the oil which is left in the water as said strip of oil-contaminated ice is loaded onto the deck, and the oil which flows down through said openings, passes down along the downwardly inclined plane and is collected in the well.

34. The apparatus of claim 33, further including means for separating out oil which collects in the well.

35. The apparatus of claim 18 further including:
means for separating impurities from the oil collected from the water and removed from the slabs; and
means for burning the separated oil to provide energy for use on board the floating platform.

36. The apparatus of claim 18 wherein:
the floating platform includes a stern; and
the means for offloading the cleaned ice slabs is constituted by conveyor means for conveying the cleaned ice slabs from where oil is removed by said oil removing means, to said stern and for offloading the cleaned ice slabs from said stern.

37. A method for cleaning-up an oil spill from a body of water containing oil-contaminated ice and floating oil, comprising:
a. providing a floating platform with a fore section and an aft section at opposite ends of a midship section, including a conveyor for loading oil-contaminated ice slabs onto the fore section, conveying these slabs along the midships section and then off of the floating platform at the aft section, wherein the floating platform includes:
i. a plurality of cutting devices in the fore section, which are mounted to cuttingly engage the oil-contaminated ice which is about to be loaded onto the conveyor, for reducing into slabs the oil-contaminated ice in the path of said floating platform,
ii. a first collector, in the fore section, for collecting floating oil from the body of water in the path of said floating platform as the ice slabs are loaded onto the floating platform therefrom;
iii. an oil removing station, in the midship section, with a cleaning device disposed adjacent the conveyor, for cleaning the ice slabs being conveyed therepast by removing from each ice slab the most oil-contaminated portion thereof;
iv. a second collector, in the midship section for collecting oil draining from and being cleaned from the ice slabs being conveyed along the midship section;
b. moving said floating platform along said path while operating the cutting devices, conveyor and oil removing station, to reduce oil-contaminated ice in the path of the vessel into slabs, convey those slabs onto the fore section of the floating platform, clean the slabs in the oil removing station, collect oil draining from and cleaned from the ice into the collector, and conveying the thus-cleaned ice off the aft section of the floating platform.

38. The method of claim 37 wherein:
the removing step comprises applying heat to the ice, sufficient to melt the most contaminated portion of the ice.

39. The method of claim 37, wherein:
the heat application step comprises spraying the ice with heated water.

40. The method of claim 37, wherein:
the removing step comprises abrading exposed parts of the ice from the bulk thereof, sufficient to remove the most contaminated portion of the ice.

41. The method of claim 40, wherein:
the abrading step comprises impinging compressed air upon exposed parts of the ice.

42. The method of claim 40 wherein:
the abrading step comprises progressively chipping away exposed parts of the ice.

43. The method of claim 40, wherein:
the removing step comprises simultaneously applying heat and abrasion to exposed parts of the ice, sufficient to remove the most contaminated portion of the ice.

44. The method of claim 43, wherein:
the heat application step comprises spraying the ice with heated water.

45. The method of claim 43, wherein:
the abrading step comprises impinging compressed air upon exposed parts of the ice.

46. The method of claim 43, wherein:
the abrading step comprises progressively chipping away exposed parts of the ice.

* * * * *